March 4, 1952  E. H. McLAUGHLIN  2,588,267
TUBE DRILL ADAPTER
Filed July 19, 1949
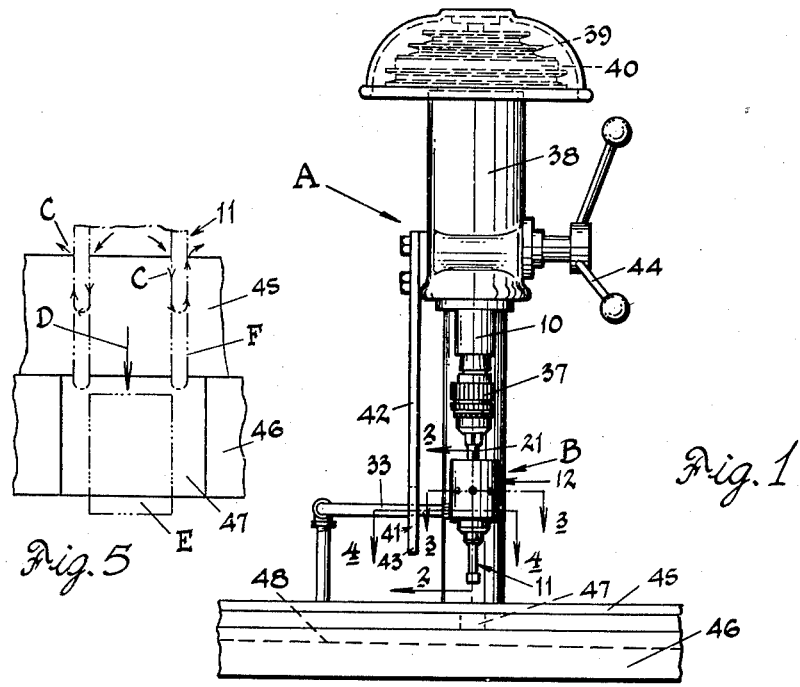
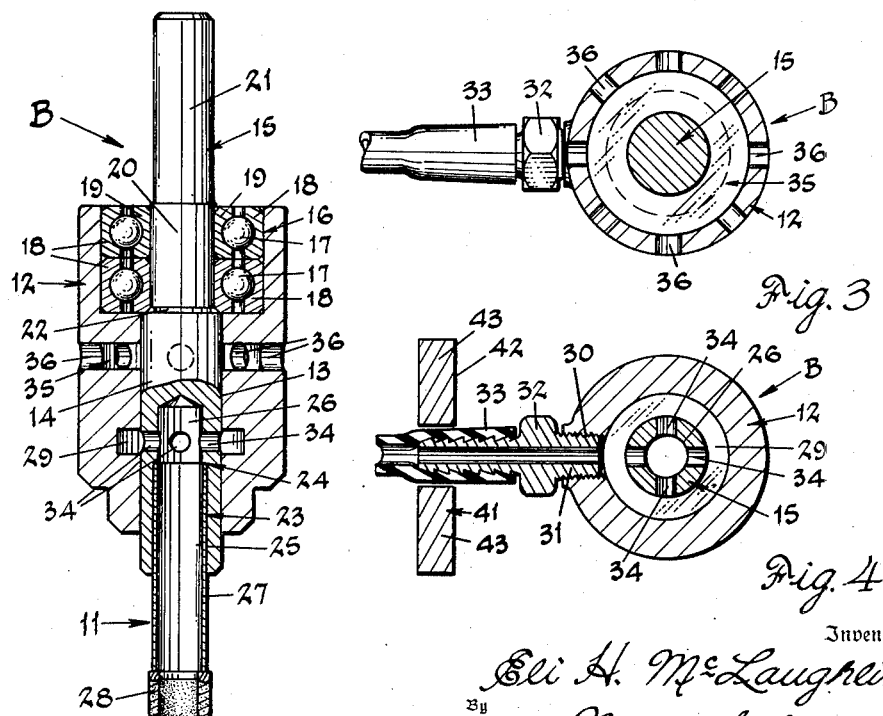
Inventor
Eli H. McLaughlin
By Nobbe & Swope
Attorneys Patented Mar. 4, 1952

2,588,267

UNITED STATES PATENT OFFICE 2,588,267

TUBE DRILL ADAPTER

Eli H. McLaughlin, Vienna, W. Va.

Application July 19, 1949, Serial No. 105,547

5 Claims. (Cl. 279—20)

The present invention relates broadly to drilling and especially to apparatus for drilling holes in sheets or plates of glass or similar hard materials.

More particularly, the invention has to do with an improved type of adapter for carrying a tubular drill and for force feeding a cooling fluid to and through said drill to the cutting area.

In the drilling of glass and like materials, the most efficient cutting action is accomplished with a high drilling speed and a minimum amount of chatter and vibration. To maintain the cutting speed within a desirably high range and yet prevent overheating of the work or the tool, a cooling fluid is continuously supplied to the cutting area. Preferably, this coolant is fed to the interior of the commonly used tubular drills so that it will be directed to the immediate cutting area. However, difficulties have heretofore been experienced in adequately supplying the coolant in such quantity or at such pressure as to obtain the highest degree of satisfactory operation. Likewise, difficulties have been experienced in revolving the drills of light drill presses at high speeds without drag which causes chatter, excess wear and strain.

It is an aim of this invention to provide an improved type of adapter for tube drills which may be satisfactorily operated within a high range of drilling speeds while an adequate supply of coolant is being force fed to the drill.

Another object of the invention is to provide a tube drill adapter of light weight and of simple construction, and which is capable of firmly supporting the drill while it is rapidly rotating therein.

Another object of the invention is to provide a tube drill adapter of the above character which can be easily and securely attached to the drill press spindle and which will permit the drill to operate smoothly at high speeds without drag and with a minimum of wear and chatter.

A further object of the invention is to provide an adapter for tubular drills which is capable of force feeding a coolant from a stationary part to a rotating part without objectionable packing and while supporting said rotating part for free movement within the range of high drilling speeds.

Other objects and advantages of the invention will become more apparent during the course of the following description when taken in connection with the accompanying drawings.

In the drawings, wherein like numerals are employed to designate like parts throughout the same:

Fig. 1 is a front elevation of a drill press equipped with one of the adapters provided by this invention;

Fig. 2 is a vertical section through the adapter taken on line 2—2 of Fig. 1;

Fig. 3 is a horizontal section taken on line 3—3 of Fig. 1;

Fig. 4 is a horizontal section taken on line 4—4 of Fig. 1, showing the fluid connection to and through the adapter; and Fig. 5 is a diagrammatic view of the drilling operation and the flow of cooling fluid.

Referring now to the drawings and particularly to Fig. 1, there is disclosed a suitable type of drill press A having a drive spindle 10 which carries the adapter of this invention which is generally designated by the letter B, and with which is associated the tubular drill 11. The drill press A, herein shown by way of example, may be referred to as a "light" drill press since the adapter B is of particular utility in connection with small diameter tube drills, although its relative size to the drill diameter can be increased proportionately to the work demand.

The adapter B comprises an annular body member 12 provided with an axial bore 13 for receiving the lower end 14 of the supporting shaft 15 and which has a relatively snug, running fit within said bore.

Formed in the upper end of the body member 12, in surrounding relation to the shaft 15, is a recess 16 for receiving therein the anti-friction bearings 17. The bearings 17 are preferably of the type known commercially as precision ground ball bearings, and while two single rows of bearings are illustrated, one double row of bearings may be used with equal facility. The outer races 18 of the bearings 17 are received in the recess 16 in "push" fit relation, while the inner races 19 are press fit onto the intermediate portion 20 of the shaft 15 so that the shaft is carried in the adapter body in a free, highly rotational manner and so that friction or thrust conditions imposed at its ends will be absorbed by the bearings.

More particularly, the intermediate portion 20 of the shaft is ground to the press fit I. D. tolerance of the bearings' inner races 19. The intermediate portion 20 of the shaft is of a slightly larger diameter than the shank or tang end 21 thereof which projects beyond the body member 12 and is separated from the lower portion 14 of the shaft by a narrow "necked" portion 22.

The shaft 15 is provided, in its end opposite the tang 21, with a cylindrical bore 23 having a diameter through the major portion of its length that corresponds to the outer surface diameter of the tube drill 11. The depth of entry of the drill into the bore 23 is limited by a shoulder 24 formed at the juncture of the larger diametered portion 25, receiving the drill, and the inner end 26 of said bore which has a somewhat smaller diameter. If preferred, however, the cylindrical bore 23 may be tapered bored which is slightly larger at its outer end than its inner end, and the drill 11 tapered to fit.

As herein shown by way of example, the drill 11 may consist of a conventional tubular diamond drill including a mounting sleeve 27 and a cutting end section 28 which are assembled in a manner well known in the art. By careful determination of the diameter of the outer portion 25 of the bore 23 relative to the mounting sleeve 27 of the drill, a rigid connection can be effected so that the parts will be integrally driven as a unit and any frictional thrust imposed at the cutting end of said drill absorbed by the bearings 17.

In operation, the adapter body 12 is held against rotation relative to the shaft 15 while being movable vertically when the drill 11 is lowered toward and into the work or is removed upwardly therefrom. The adapter body is thus capable of being connected to a source of coolant supply and a method of connection effected whereby the coolant can be supplied under a desired pressure. To this end, the bore 23 in shaft 15 is enlarged at a point above the upper end of the tube drill 11 to provide an annular coolant supply chamber 29 and the wall of the body member 12 is drilled and tapped as at 30 to receive the threaded end 31 of a tube fitting 32 which communicates with the chamber 29. The outer end of the fitting 32 is conventionally formed to receive thereon a flexible tube 33 which is employed as a conduit to carry the coolant fluid from a pressurized source of supply (not shown) to the chamber 29. Formed in the shaft 15 and establishing communication between the chamber 29 and the inner end 26 of the bore 23, are a plurality of ports 34, as shown in Fig. 4, arranged in diametric relation.

The cooling fluid is adapted to be supplied under sufficient pressure during the drilling operation to produce an outward force across the cutting end 28 of the drill 11 and upward along the wall of the hole being formed in the work to flush away the waste material. Constant movement of the cooling fluid under pressure also assures a continual absorption of the drill heat, and consequently the drill and the material on either side thereof will remain cooler.

It has been found from actual practice that with the use of the adapter herein provided, a hole approximately one inch deep can be cut in a glass plate in from twelve to fifteen seconds using a one-half inch diameter diamond tube drill. During this drilling operation, coolant under a pressure of 40 p. s. i. was fed through the adapter to the drilling area. The drill may be driven between 3,000 and 5,000 R. P. M. with no objectionable friction or vibration.

As positive force is created between the drill and work as the drill enters into the work, the free passage of the coolant through the drill will be resisted and a back pressure, built up in the chamber 29, will tend to force a portion of the coolant upwardly along the shaft 15 in the bore 13 of the adapter body. While the pressure may be modified to reduce such a back pressure condition, this is not desirable and therefore means is herein provided to receive and permit the escape of this coolant before it reaches the antifriction bearings 17. To this end, there is provided, in surrounding relation to the shaft 15, a chamber 35 located above the supply chamber 29. The chamber 35 communicates with the atmosphere through openings 36 in the outer wall of the body member and, since the adapter body is stationary, there will be little or no pressure within the chamber. Consequently, coolant escaping upwardly along the bore 13 or around the shaft 15 will be received in a "free" air zone and the force of its movement dissipated. Ultimately, it will flow outward through the openings 36 and drain downwardly onto the work.

In practice, the tang end 21 of the adapter B is inserted into the chuck 37 of the drill press A and secured therein in the usual manner. The drill chuck 37 is carried in the lower end of the drive spindle 10 which is journaled in the head carriage 38 and driven at its opposite end by a pulley 39 about which a belt 40 is trained. As the adapter is located in the drill chuck 37, the tubing 33 which is connected to the adapter body 12 by the fitting 32 is disposed so as to enter the bifurcated end 41 of a plate 42 that extends from the head carriage 38. When the spindle 10 is rotating to drive the tube drill 11 through the shaft 15 of the adapter, the extensions 43 of the bifurcated end 41 will engage the tubing 33 and prevent rotation of the adapter body 12 while permitting vertical movement thereof when the drive spindle is raised or lowered.

The quill of the drive spindle 10 is associated with an operating lever 44 so that when the drilling operation is started, the spindle 10, adapter B, and tube drill 11 will be lowered toward the work piece 45 supported on a table 46. Preferably, the table 46 has a suitable opening 47 to receive the drill upon completion of the cut, and troughs 48 formed in the sides thereof to receive the draining coolant.

While the tube drill 11 is operatively engaged with the work, the downward force of the coolant under pressure causes continual movement of the coolant through the drill, laterally across its cutting edge, and thence upward along the walls of the hole being formed in the work. Upon completion of the drilling operation, the pent-up energy of the coolant wtihin the tube drill will force the resultant core cut from the work outwardly so that the drill, when raised, will be free of any waste and conditioned for subsequent work.

In Fig. 5, the arrows C indicate the path of coolant which completely covers the cutting end 28 of the drill 11 and thereby maintains the drill and work at a constantly desirably low working temperature. The arrow D indicates the outward thrust imposed on the plug or core E to eject it from the work 45 and drill 11 when the drill completes its cut as indicated by broken lines F.

While the embodiments of the invention have been set forth in relation to one form of tube or core drill, it is not the intention to limit the invention to any specific type. However, contrary to other methods, it has been found possible with the use of the adapter herein provided to employ diamond drills of small diameter, at a desired higher rate of speed and at a maintained lower temperature than heretofore. Since both the drill and the work remains relatively cool, the drill retains its cutting edge longer and the drilling operation may be performed much more rapidly and effectively.

It is to be understood that the forms of the invention herewith shown and described is to be taken as the preferred embodiment of the same, and that various changes in the shape, size and arrangement of parts may be resorted to without departing from the spirit of the invention or the scope of the subjoined claims.

I claim:

1. An adapter for tube drills, comprising an annular body member having an axial bore therethrough and a chamber therein, a supporting shaft rotatable within said bore and having a hollow portion communicating with said chamber, means carried by the body member for rotatably mounting the shaft adjacent its upper end, a tube drill carried at the lower end of said shaft, means connecting the body member to a source of cooling fluid under pressure for feeding said fluid to said chamber from which it passes into the hollow portion of the shaft and thence through the tube drill to the cutting area thereof, and means provided in the said body member for preventing cooling fluid moving upwardly under pressure from said chamber along the outer surface of said shaft from reaching the mounting means for the said shaft.

2. An adapter for tube drills, comprising an annular body member having an axial bore therethrough and a chamber therein, a supporting shaft rotatable within said bore and having a hollow portion communicating with said chamber, means carried by the body member for rotatably mounting the shaft adjacent its upper end, a tube drill carried at the lower end of said shaft, and means connecting the body member to a source of cooling fluid under pressure for feeding said fluid to said chamber from which it passes into the hollow portion of the shaft and thence through the tube drill to the cutting area thereof, said body member being provided with a second chamber above said first chamber and open to the atmosphere for receiving cooling fluid moving upwardly under pressure along the outer surface of the shaft from the first mentioned chamber.

3. An adapter for tube drills, comprising an annular body member having an axial bore therethrough and a chamber therein, a supporting shaft rotatable within said bore and having a hollow portion provided with ports communicating with said chamber, anti-friction means carried by the body member at its upper end for rotatably mounting said shaft, a tube drill carried in the lower end of said shaft, means connecting the body member to a source of cooling fluid under pressure for feeding said fluid to said chamber from which it passes through said ports into the hollow portion of the shaft and thence through the tube drill to the cutting area thereof, and means provided in the said body member for preventing cooling fluid moving upwardly under pressure from said chamber along the outer surface of said shaft from reaching the mounting means for the said shaft.

4. An adapter for tube drills, comprising an annular body member having an axial bore therethrough and a chamber therein, a supporting shaft rotatable within said bore and having a hollow portion provided with ports communicating with said chamber, anti-friction means carried by the body member at its upper end for rotatably mounting said shaft, a tube drill carried in the lower end of said shaft, and means connecting the body member to a source of cooling fluid under pressure for feeding said fluid to said chamber from which it passes through said ports into the hollow portion of the shaft and thence through the tube drill to the cutting area thereof, said body member being provided with a second chamber above said first chamber and open to the atmosphere for receiving cooling fluid moving upwardly under pressure along the outer surface of the shaft from the first mentioned chamber.

5. An adapter for tube drills, comprising an annular body member having an axial bore extending therethrough and being enlarged to form a lower chamber and an upper chamber, a supporting shaft rotatable within said bore and having a hollow portion provided with ports adjacent its upper end communicating with the lower chamber, anti-friction bearings arranged within a recess in the upper end of the body member for rotatably mounting said shaft, a tube drill fitted within the lower end of the hollow portion of said shaft, and means connecting the body member to a source of cooling fluid under pressure for feeding said fluid to the lower chamber from which it passes through said ports into the hollow portion of the shaft and thence downwardly through the tube drill to the cutting area thereof, the upper chamber being open to the atmosphere and serving to receive cooling fluid moving upwardly under pressure from the lower chamber along the outer surface of said shaft and thereby prevent said cooling fluid from reaching the anti-friction bearings.

ELI H. McLAUGHLIN.

REFERENCES CITED

The following references are of record in the file of this patent:

UNITED STATES PATENTS

| Number | Name | Date |
|---|---|---|
| 904,692 | Greve et al. | Nov. 24, 1908 |
| 932,060 | Richards | Aug. 24, 1909 |
| 982,397 | Taylor | Jan. 24, 1911 |
| 1,028,623 | Smith | June 4, 1912 |
| 1,232,111 | Smith | July 3, 1917 |
| 1,739,141 | Hansen | Dec. 10, 1929 |